Feb. 9, 1960    L. H. LUCKER, JR    2,924,128
BORING BAR
Filed May 12, 1958    2 Sheets-Sheet 1
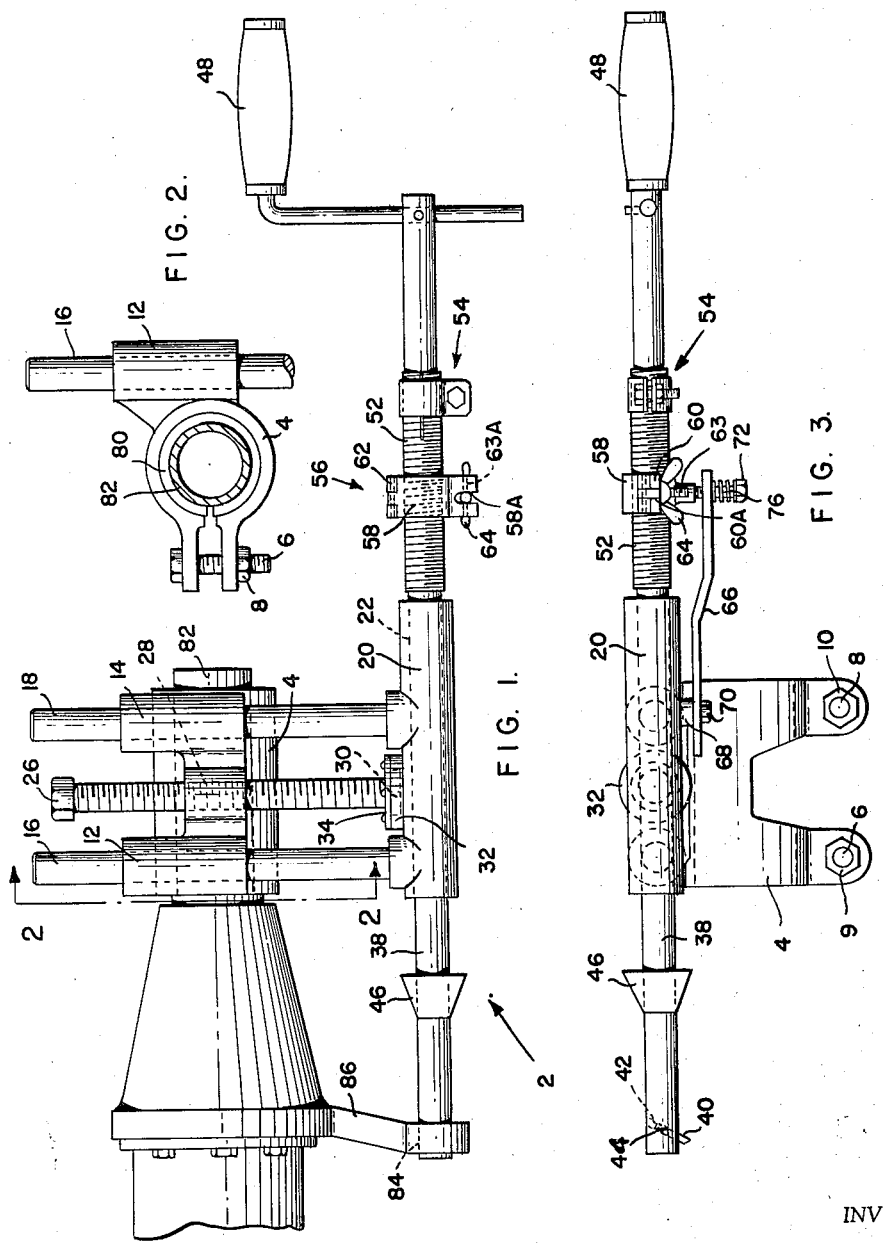
INVENTOR.
LAURENCE H. LUCKER, Jr.
BY
ATTORNEYS Feb. 9, 1960 L. H. LUCKER, JR 2,924,128
BORING BAR Filed May 12, 1958 2 Sheets-Sheet 2

INVENTOR.
LAURENCE H. LUCKER, Jr.
BY
ATTORNEYS

United States Patent Office 2,924,128
Patented Feb. 9, 1960

2,924,128

BORING BAR

Laurence H. Lucker, Jr., Springfield, Pa., assignor to Lucker Manufacturing Co., Philadelphia, Pa., a corporation of Pennsylvania Application May 12, 1958, Serial No. 734,553

2 Claims. (Cl. 77—2)

This invention relates to a boring bar having particular utility for reboring worn or distorted brake anchor pinholes and brake cam shaft holes in the spider or differential housing of the load tube of a vehicle such as a bus or truck and also for reboring kingpin bushing holes.

The boring bar of this invention is highly advantageous since it eliminates hours of intricate axle disassembly normally required for the reboring of anchor pinholes and brake cam shaft holes. The design of the boring bar makes it possible to construct it so as to be of light weight and yet to provide a boring bar which is capable of being operated rapidly and with accuracy.

The boring bar of this invention in association with its adapter provide for the rapid and accurate in line boring of kingpin bushing holes. Through the use of this boring bar, perfect alignment and fit of the kingpin is assured. Further, it provides for the rapid boring of these holes.

The objects and advantages of the boring bar in accordance with this invention will be made further apparent from a reading of the following description in conjunction with the drawings in which:

Figure 1 is a plan view of a boring bar in accordance with this invention;

Figure 2 is a section taken on the plane indicated by the line 2—2 in Figure 1;

Figure 3 is a side elevation of the boring bar of Figure 1;

Figure 4:
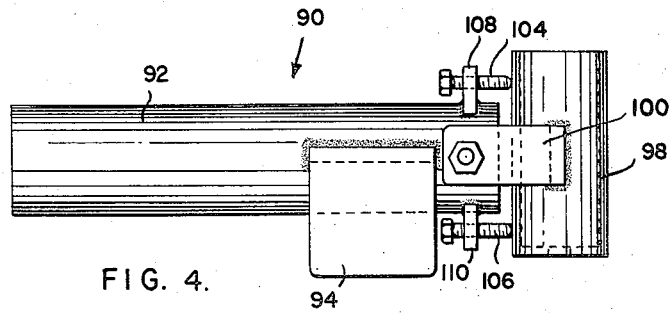
Figure 4 is a side elevation of a kingpin adapter for use in association with the boring bar of Figure 1.

As shown in Figures 1 through 3, a boring bar 2 in accordance with this invention is provided with a securing clamp 4 which has adjustment bolts 6 and 8 secured by nuts 9 and 10 respectively. A pair of guide sleeves 12 and 14 are integrally secured to clamp 4 and slidably accommodate guide rods 16 and 18 respectively. Guide rods 16 and 18 are fixedly secured to housing 20 which has a bore 22. The axis of bore 22 is parallel to the axis of clamp 4. The distance between these axes can be accurately adjusted by means of a bolt 26 which is threadably connected to clamp 4 at 28 and is rotatably connected to housing 20 by virtue of enlarged head 30 which is secured within hollowed boss 32 by means of a cap 34.

A round boring bar 38 is rotatably and slidably mounted in bore 22 of housing 20. A cutter bar 40 is secured to one end of bar 38 in a slot 42 by a screw 44. A tapered collar 46 is slidably secured on bar 38 between cutter 40 and housing 20. At the opposite end of bar 38, there is provided a handle 48 for the rotation of bar 38.

Between housing 20 and handle 48, there is provided a threaded sleeve 52 which is secured to bar 38 by means of a clamp shown at 54. A split, threaded clamp 56 is removably secured to threaded sleeve 52. Clamp 56 has a pair of opposed threaded members 58 and 60 which are pivoted together at 62 and are slotted at 58A and 60A respectively. Members 58 and 60 are removably held together by means of a bolt 63 pivotally secured to a pin 63A mounted in member 58 and a butterfly nut 64. Clamp 56 is secured to housing 20 by means of a bracket 66. Bracket 66 is secured to boss 68 on housing 20 by bolt 70 and is secured to threaded member 60 of clamp 56 by means of bolt 72. Compression coil spring 76 acts to urge member 60 away from sleeve 52 so that when clamp 56 is opened member 60 will be disengaged from the threads of sleeve 52.

*Operation*

Clamp 4 is adapted to engage an axle housing either directly or to clamp a split sleeve 80 against an axle housing, for example, the housing 82 shown in Figures 1 and 2. The clamp 4 is moved around the housing 82 and bolt 26 is adjusted until bar 38 becomes coaxial with the opening to be bored, for example, the brake anchor pin opening 84 in spider 86. The proper positioning of bar 38 with respect to opening 84, is accomplished readily by inserting tapered sleeve 46 into opening 84 adjusting the position of bar 38 by bolt 26 and clamp 4 so that the sleeve 46 can enter opening 84 uniformly. During this operation, clamp 56 is opened so that it is disengaged from threaded sleeve 52 which permits the free sliding of bar 38 in housing 20.

After the bar 38 has been accurately positioned it is slidably moved to the right as viewed in Figure 1 and cutter bar 40 having been removed or withdrawn within slot 42 is secured in the desired cutting position in slot 42 by screw 44, clamp 4 is tightly secured, sleeve 46 is withdrawn towards housing 20 and clamp 56 is closed so as to threadably engage the threaded sleeve 52. Clamp 56 having already been tightened, handle 48 is then rotated clockwise to advance the cutter towards opening 84 and through the opening to make the desired cut. The reboring operation having been completed, clamp 56 is opened and bar 38 is slidably moved to withdraw the cutter from opening 84 thus completing the operation.

Figure 5:
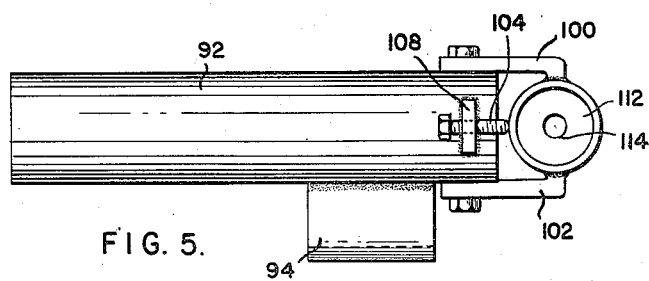
Figure 5 is a plan view of the adapter of Figure 4.
Figure 6:
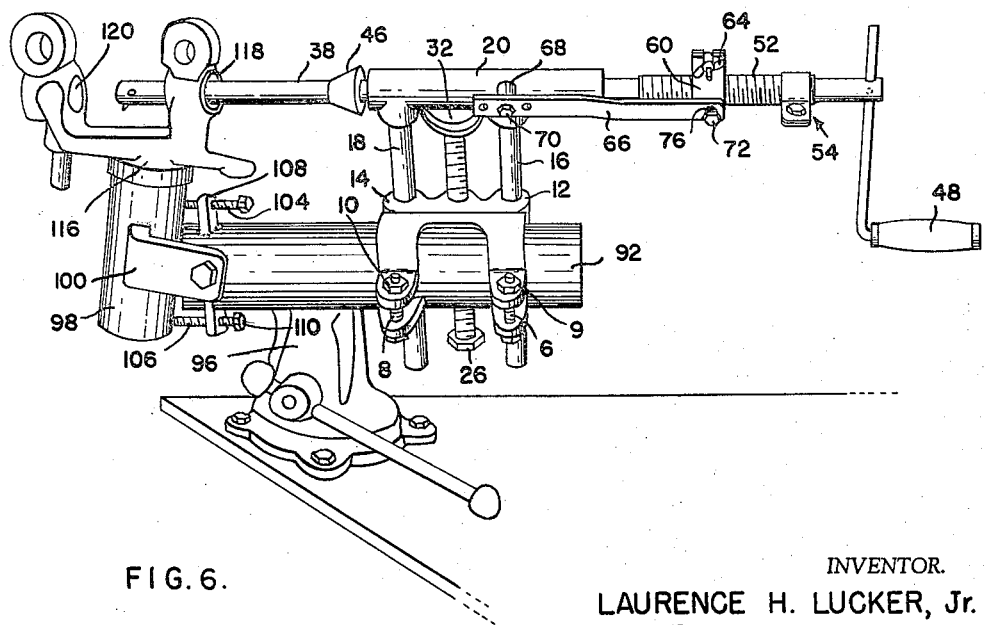
Figure 6 is a side elevation showing the employment of the boring bar of Figure 1 in association with the adapter of Figure 4 to rebore kingpin openings.

Referring now to Figures 4 through 6, an adapter 90 is provided for boring kingpin bushing holes. Adapter 90 has a cylindrical body 92 to which is attached a flange member 94 which is adapted to be secured in a conventional bench vice 96. A hollow receptacle 98 for a steering spindle is secured to body 92 by means of brackets 100 and 102 which are bolted to body 92. The angle at which the axis of receptacle 98 intersects the axis of body 92 can be adjusted by means of set screws 104 and 106 which are threadably secured to ears 108 and 110 respectively, which are secured to body 92.

The bottom of receptacle 98 is provided with a plate 112 having an opening 114 for the reception of the threaded end portion of the steering spindle.

In operation the steering spindle 116 is placed in the receptacle 98 and a nut threaded onto the end of the spindle to retain it securely in the receptacle. By means of set screws 104 and 106, the receptacle 98 is adjusted so that the axis of the kingpin bushing openings 118 and 120 lies parallel to the axis of body 92.

Secured to body 92 by means of clamp 4 is a boring bar identical with that of the boring bar of Figures 1 through 3. Clamp 4 and bolt 26 are adjusted so that boring bar 38 is properly aligned with opening 118 and 120 as determined with two tapered sleeves 46. The operation of boring bar 38 is then identical with that heretofore described and it can be operated to ream openings 118 and 120. It will be appreciated that the reaming of openings 118 and 120 will provide bushing holes which are in perfect alignment.

It is not desired to be limited except as set forth in the following claims.

What is claimed is:

1. In combination, a boring device and an adapter for supporting a steering spindle, said boring device comprising a clamp member adapted for embracing a cylindrical support, a housing member laterally spaced from and having a bore with its axis parallel to the axis of the clamp, means for moving said clamp and housing laterally relative to one another while maintaining the parallel relation aforesaid, a boring bar rotatably and slidably mounted in said housing, a cutter on one end of the bar and a handle at the other end, a tapered collar for centering the bar slidably mounted on the bar between the housing and the end of the bar having the cutter, a threaded portion on said bar between the housing and the handle, a threaded clamp secured to the housing and removably clamped to said threaded portion, and said adapter comprising a cylindrical support, and a tubular member extending cross-axially of said cylindrical support, one end portion of said cylindrical support being embraced by said clamp, and the opposite end portion of said cylindrical support mounting said tubular member, the latter being adapted for receiving said steering spindle and securing the same in position with the kingpin bushing openings thereof in alignment with said boring bar.

2. In combination, a boring device and an adapter for supporting a steering spindle, said boring device comprising a clamp member adapted for embracing a cylindrical support, a housing member laterally spaced from and having a bore with its axis parallel to the axis of the clamp, means for moving said clamp and housing laterally relative to one another while maintaining the parallel relation aforesaid, a boring bar rotatably and slidably mounted in said housing, a cutter on one end of the bar and a handle at the other end, a tapered collar for centering the bar slidably mounted on the bar between the housing and the end of the bar having the cutter, a threaded portion on said bar between the housing and the handle, a threaded clamp secured to the housing and removably clamped to said threaded portion, and said adapter comprising a cylindrical support, a tubular member extending across and pivotally supported upon one end portion of said cylindrical support, the opposite end portion of said cylindrical support being embraced by said clamp, said tubular member being adapted to receive and hold said steering spindle, and means for selectively adjusting the angular relation between said tubular member and cylindrical support thereby to align the kingpin openings of said steering spindle with said boring bar.

References Cited in the file of this patent

UNITED STATES PATENTS

| 397,311 | Schoff | Feb. 5, 1889 |
| 672,284 | Nuttall | Apr. 16, 1901 |
| 1,097,318 | Heiser | May 19, 1914 |
| 1,364,346 | Adams | Jan. 4, 1921 |
| 1,476,724 | Pearson | Dec. 11, 1923 |
| 2,091,628 | Carlson | Aug. 31, 1937 |

FOREIGN PATENTS

| 601,199 | Great Britain | Nov. 9, 1942 |